Figure 1:
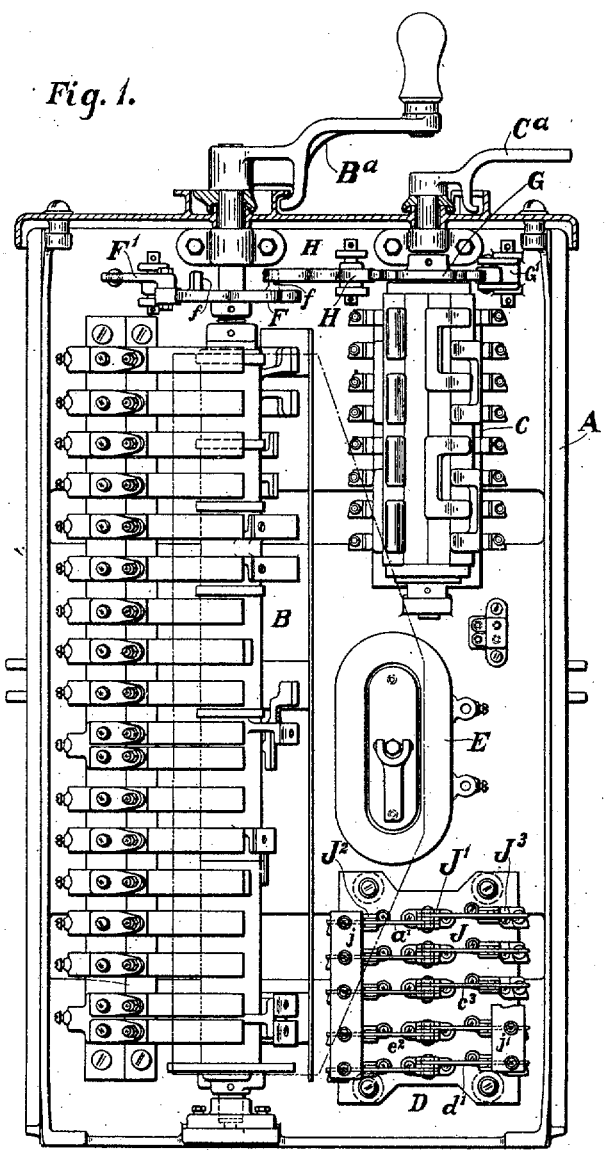

No. 871,970. PATENTED NOV. 26, 1907.
E. W. STULL.
SYSTEM OF MOTOR CONTROL.
APPLICATION FILED MAR. 31, 1906.

5 SHEETS—SHEET 1.

WITNESSES
Oliver W. Sharman
Fred J. Kinsey

INVENTOR
Emmett W. Stull
BY
Chas. E. Lord
ATTORNEY

No. 871,970. PATENTED NOV. 26, 1907.
E. W. STULL.
SYSTEM OF MOTOR CONTROL.
APPLICATION FILED MAR. 31, 1906.

5 SHEETS—SHEET 2.

Fifth Series Position
All Motors In.

Final Series Position
Motors 1 & 2 Cut Out.

Final Parallel Position.
Motors 3 & 4 Cut Out.

WITNESSES
Oliver W. Harmon
Fred J. Kinsey

INVENTOR
Emmett W. Stull
BY
Chas. E. Lord
ATTORNEY

THE NORRIS PETERS CO., WASHINGTON, D. C.

No. 871,970. PATENTED NOV. 26, 1907.
E. W. STULL.
SYSTEM OF MOTOR CONTROL.
APPLICATION FILED MAR. 31, 1906.

5 SHEETS—SHEET 3.

WITNESSES
Oliver W. Sharman
Fred J. Kinsey

INVENTOR
Emmett W. Stull
By
Chas. E. Lord
ATTORNEY

No. 871,970. PATENTED NOV. 26, 1907.
E. W. STULL.
SYSTEM OF MOTOR CONTROL.
APPLICATION FILED MAR. 31, 1906.
5 SHEETS—SHEET 4.
Fig. 8
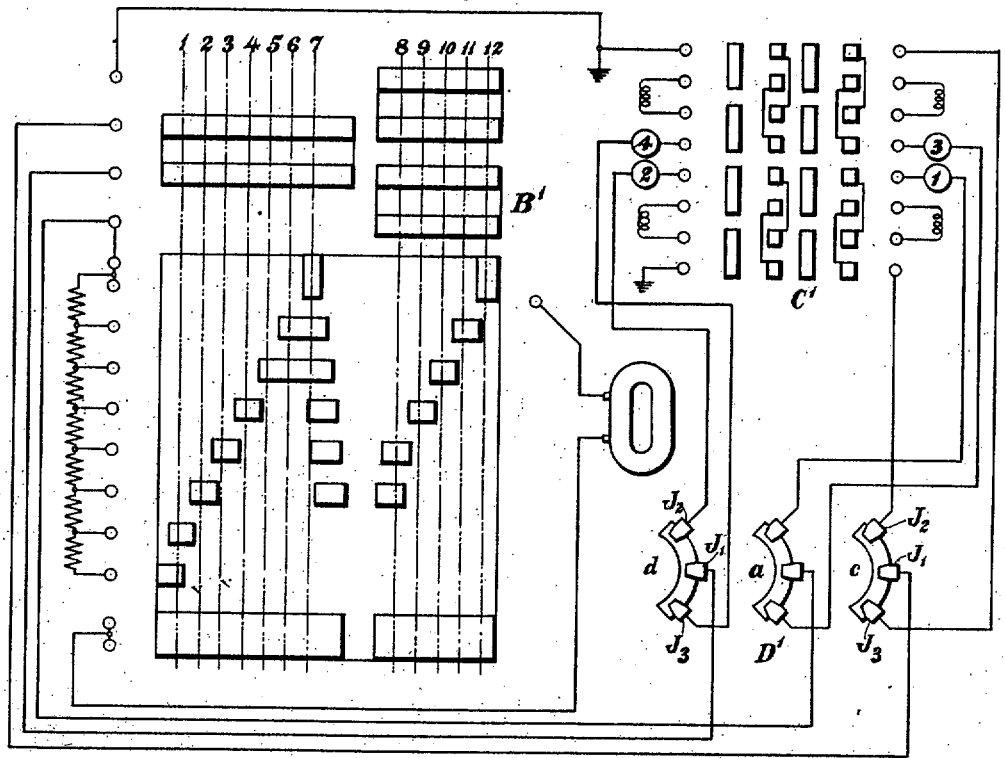
Series Position
All Motors In.
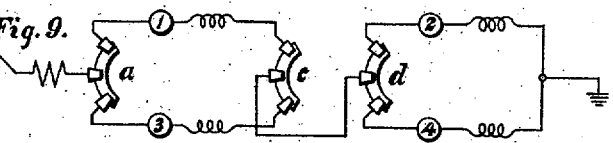
Series Position
Motors 1 and 2 Cut Out.
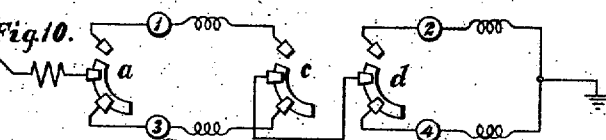
Parallel Position
Motors 3 and 4 Cut Out.
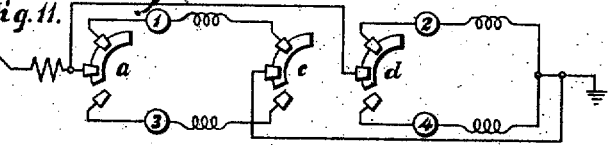
WITNESSES
Oliver Sharman
Fred J. Kinsey
INVENTOR
Emmett W. Stull
BY
Chas. E. Lord
ATTORNEY
THE NORRIS PETERS CO., WASHINGTON, D. C.

No. 871,970. PATENTED NOV. 26, 1907.
E. W. STULL.
SYSTEM OF MOTOR CONTROL.
APPLICATION FILED MAR. 31, 1906.

5 SHEETS—SHEET 5.

WITNESSES

INVENTOR
Emmett W. Stull
BY,
Chas. E. Lord
ATTORNEY

UNITED STATES PATENT OFFICE.

EMMETT W. STULL, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

SYSTEM OF MOTOR CONTROL.

No. 871,970.   Specification of Letters Patent.   Patented Nov. 26, 1907.

Application filed March 31, 1906. Serial No. 309,026.

*To all whom it may concern:*

Be it known that I, EMMETT W. STULL, citizen of the United States, residing at Norwood, in the county of Hamilton and State of Ohio, have invented certain new and useful Improvements in Systems of Motor Control, of which the following is a full, clear, and exact specification.

My invention relates to controllers for electric motors, and particularly to railway controllers of the type adapted to control a plurality of motors.

One of the objects of my invention is to enable injured or disabled motors to be cut out of circuit without affecting the action of the controller upon the remaining motors and without interfering with the action of the latter.

Heretofore, when a motor was injured and was therefore cut out, the other motors could only be operated in certain positions of the controller, there being a positive lock to prevent movement of the controller beyond certain positions when the cut-out switch was operated to cut out any of the motors. Such being the case the controller could not most efficiently connect the uninjured motors, thus causing a waste of energy. With my invention this is avoided and the uninjured motors can be connected in the most efficient manner, without danger of an excessive flow of current through them, and without the necessity of using a positive lock in the controller to prevent its movement beyond certain positions or of having special connections in the cut-out switch in order to complete the motor circuits.

Another object of my invention is to provide a novel interlock between the main controlling drum and the reversing switch so that it will be impossible for an ignorant or careless operator to reverse the motors while the current is flowing through the motor circuits.

In one of its aspects my invention consists in a controlling drum and coöperating contact fingers controlling the current supply to a plurality of motors and a cut-out switch whereby some of said motors may be cut-out without changing the electrical action of said drum or fingers.

More in detail my invention comprises two parallel connected pairs of electric motors, a controller for connecting the motors of each pair both in series and parallel relation, and a single cut-out switch for cutting out either pair of motors while still permitting the series-parallel control of the remaining pair.

In another aspect my invention comprises a controlling drum, a reversing switch whose shaft carries a notch plate, an arm biased into the notches of the notch plate approximately axially of said notches to lock the reversing switch, and means for pressing the arm out of said notches when the controller drum is in a predetermined position.

In still another aspect my invention comprises a main controlling drum, a star-wheel therefor, a reversing switch, a notch plate therefor, an arm spring-pressed toward engagement with said notch plate to lock it and the reversing switch when in such engagement, a projection from the arm extending over the star-wheel of the controlling drum and arranged to be engaged by a lug or spur on said star-wheel in a predetermined or "off" position of the controlling drum, thereby, and then only, forcing the arm out of engagement with the reversing switch notch plate and unlocking the reversing switch.

My invention also comprises a novel form of cut-out switch.

Other features of my invention will be more particularly set forth in the following description and accompanying drawings and will be particularly pointed out in the appended claims.

Figure 2:
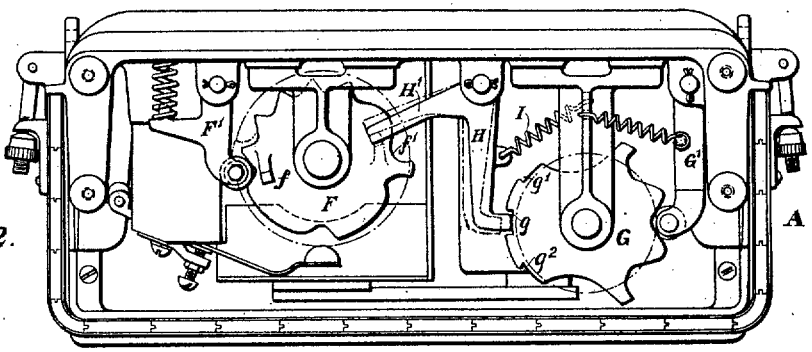
Figure 3:
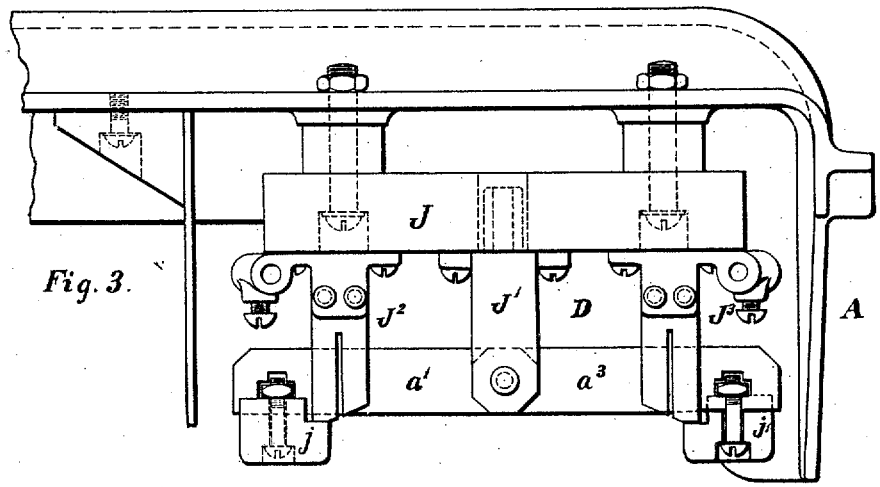
Figure 5:
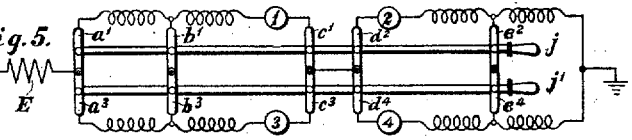
Figure 6:
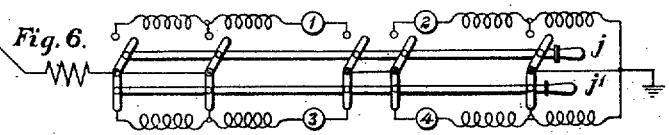
Figure 7:
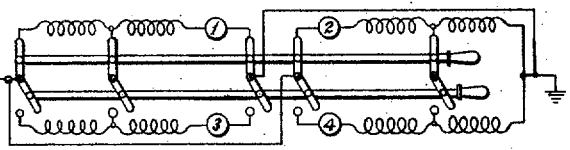
Figure 4:
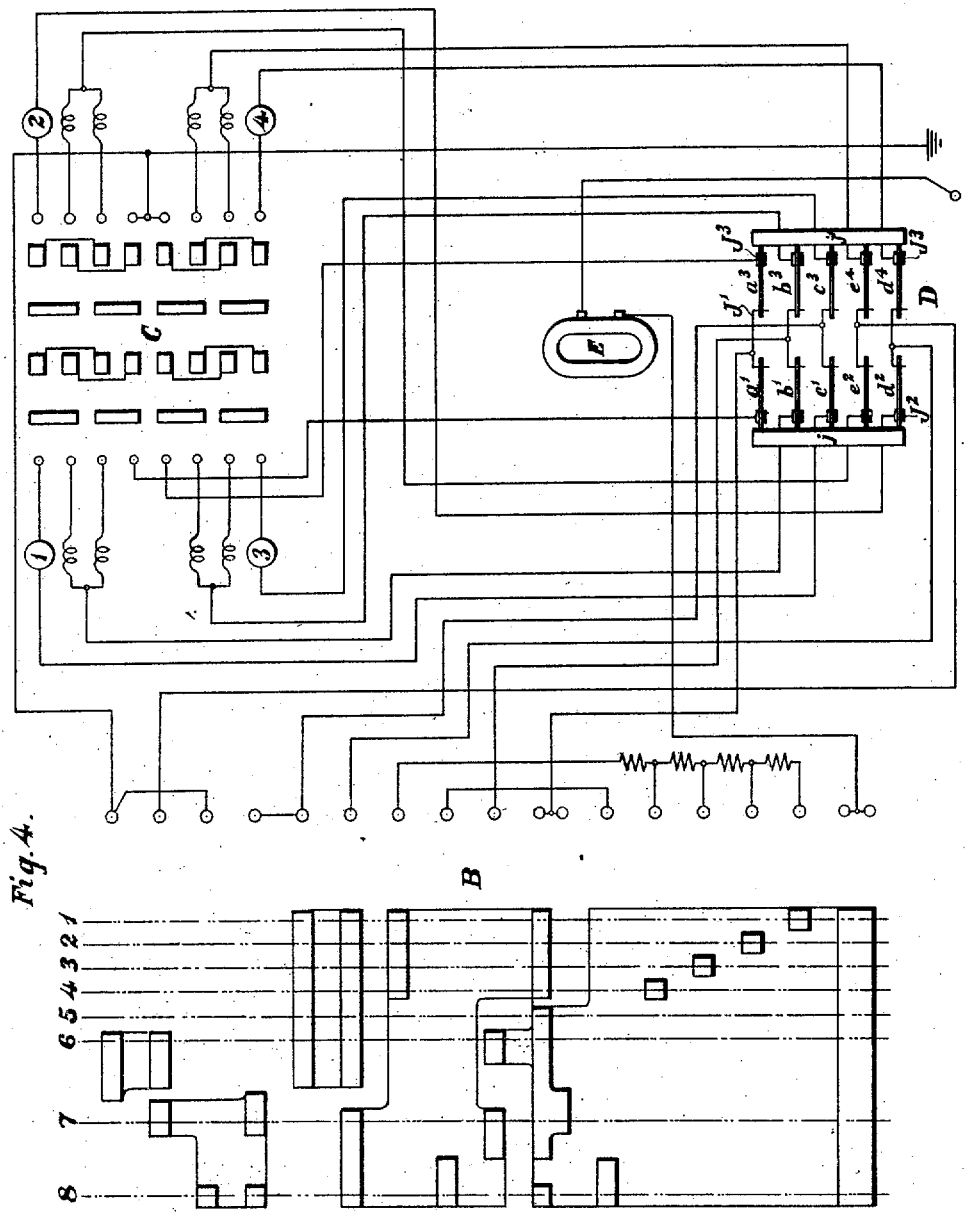
Figure 12:
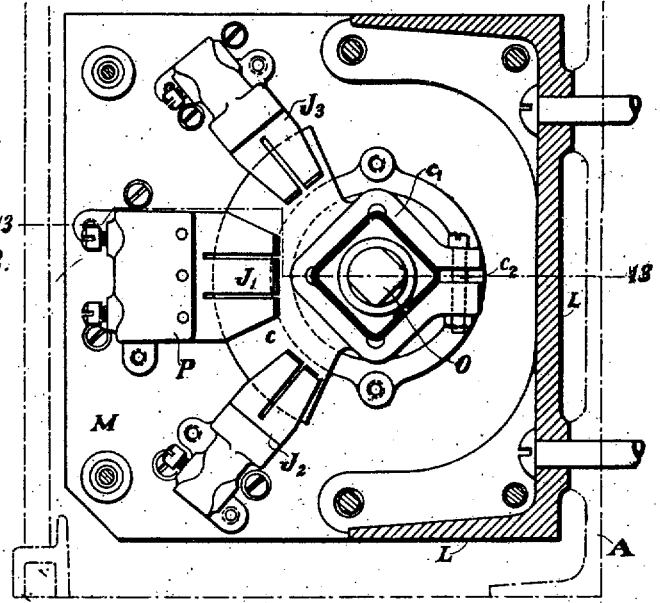
Figure 13:
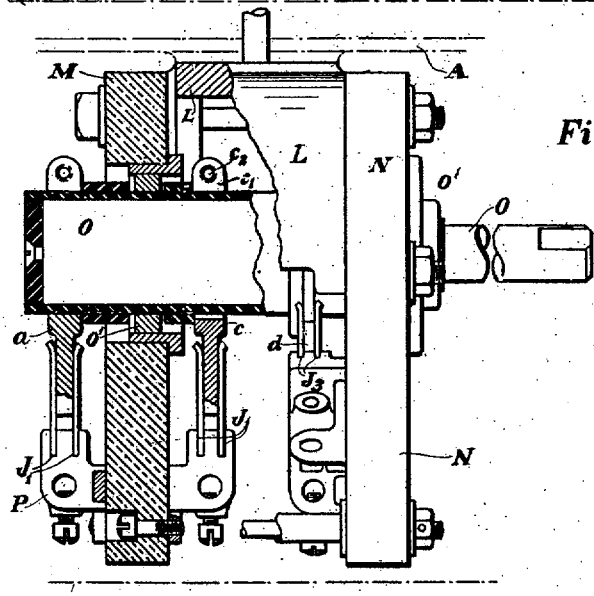

Figure 1 is an elevation of a controller with the front part of the casing removed showing my novel form of interlock and one arrangement of my cut-out switch. Fig. 2 is a plan view of my controller with the cover removed, showing the operation of the interlocking mechanism. Fig. 3 is a plan view of the form of cut-out switch shown in Fig. 1. Fig. 4 is a diagram showing the electrical connections used with the controller and cut-out switch shown in Fig. 1. Figs. 5, 6 and 7 are simple connection diagrams showing the operation of the cut-out switch of Fig. 1 in the series and parallel positions of the main controller shown in Fig. 1. Fig. 8 is a diagram similar to Fig. 4 showing the electrical connections used with another form of controller and cut-out switch. Figs. 9, 10 and 11 are simple connection diagrams showing the operation of the cut-out switch of Fig. 8 in the series and parallel positions of the controller of Fig. 8. Fig. 12 is a front elevation of the cut-out switch of Fig. 8 with the plate N and the contacts mounted thereon removed, and with the frame L in section, and Fig. 13 is a side elevation of the same, partly in section on the line 13—13 of Fig. 12.

In Figs. 1 to 7 inclusive, A is the usual controller casing of any desired construction and within this casing A are the main series-parallel controlling drum B, the reversing switch C, the cut-out switch D and the blow-out magnet E. The controlling drum and the reversing switch are provided with the usual operating handles $B^a$ and $C^a$. As usual these handles can only be removed in the "off" positions of their respective switches. The particular construction of the controlling drum, reversing switch and blow-out magnet form no part of my present invention but are shown to aid in obtaining a clearer understanding thereof.

Upon the shafts of the controlling drum and reversing switch are notch plates or star-wheels F and G respectively. These notch plates, and through them the controller and the reversing switch, are held in proper contacting position and against accidental displacement by spring-pressed arms $F'$ and $G'$, which carry at their ends rollers coöperating with the respective notch plates. Another arm H is pivoted on the casing A, its free end being pressed by a spring I towards the notch plate G. Unless otherwise held out of engagement therewith, the free end of arm H engages with and is seated in one of the notches $g$, $g'$ or $g^2$ of the notch plate G to lock it and the reversing switch against movement. A projection $H'$ from the arm H extends over the star-wheel F into the path of a lug $f$ thereon. The arm H and its projection $H'$ together form a bell-crank lever. The lug $f$ is so placed relatively to the notches of the star-wheel F that when the roller of arm $F'$ is seated in the "off" notch $f'$, the lug $f$ engages with projection $H'$ and forces the free end of arm H out of notch $g$, $g'$ or $g^2$, as the case may be, thus unlocking the reversing switch as shown in dotted lines in Fig. 2. In all other positions of the notch plate, i. e. whenever the controller is in any of its "on" positions, the lug $f$ is out of engagement with the projection $H'$ and the free end of arm H rests in one of the notches $g$, $g'$ or $g^2$ thereby locking the reversing switch against movement as shown in full lines in Fig. 2. Thus it is impossible to move the reversing switch save in a predetermined or "off" position of the main controller drum.

In Fig. 3 is shown a plan view of one form of cut-out switch invented by me. Bolted to the back of the controller casing is a plate J of insulation, upon which are mounted the pivotal supports $J'$ and the stationary contacts $J^2$ and $J^3$ of the switch blades $a^1$, $a^3$, $b^1$, $b^3$, $c^1$, $c^3$, $d^2$, $d^4$, $e^2$, $e^4$, of the cut-out switch. One set of blades $a^1$, $b^1$, $c^1$, $d^2$, and $e^2$, is fastened together by a bar of insulation $j$, the remaining blades being fastened together in another set by a similar bar $j'$, these bars serving as handles whereby the blades of each set may be operated simultaneously.

The controller is shown in connection with four series wound motors 1, 2, 3 and 4, the motors 1 and 3 forming one pair or set connected in parallel and the motors 2 and 4 forming another pair or set similarly connected in parallel. The controller is arranged to connect these pairs both in series and in parallel relation, the final series position short-circuiting half of the series field of each motor. The connections for the fifth series position of the controller are shown in diagram in Fig. 5, the final series position in Fig. 6 and the final parallel position in Fig. 7.

Instead of considering the arrangement of motors as two pairs of parallel connected motors with the motors 1 and 3 as one pair and the motors 2 and 4 as the other, it may be considered as two parallel connected pairs of motors, 1 and 2 forming one pair, and 3 and 4 forming the other, the controller acting to connect the two motors of each pair first in series and then in parallel.

The pivotal supports $J'$ of the cut-out switch are connected to various contacts of the controller, while the stationary contacts $J^2$ and $J^3$ are connected to different points of the four motors as shown in Figs. 4 to 7 inclusive. Fig. 5 shows the arrangement of connections with all of the motors connected. If it is desired to disconnect a certain motor or motors as because of the burning out or otherwise disabling thereof, either the handle $j$ or $j'$ is pulled outward and two of the motors disconnected. If handle $j$ is pulled outward and the switch blades connected thereto opened as shown in Fig. 6, the motors 1 and 2 are disconnected leaving motors 3 and 4 still connected to the controller in the same manner as before, so that the latter has the same series-parallel control over them as when the other two motors were connected. If the handle $j'$ is pulled outward and the switch blades connected thereto opened, as shown in Fig. 7, the motors 3 and 4 are cut out leaving the motors 1 and 2 still under the same control of the controller as if 1 and 2 had not been cut out. The effect of the controller drum in its various positions is the same upon any other particular motor or motors whether the other pair of motors is connected or disconnected and the cutting out of one pair of motors does not interfere in the least with the series-parallel control of the other pair.

A cut-out switch having five pairs of switch blades is used with the controller shown in Figs. 1 to 7 inclusive because of the cross or equalizing connection between the middle points of the field windings of motors 1 and 3, and 2 and 4, and because in position 6 of the controller one half of each field winding is short-circuited as shown diagrammatically in Fig. 6. In some forms of controllers, these cross connections are not used and no part of the field windings is ever short-circuited. In such an arrangement, the pairs of switch blades $b^1$, $b^3$ and $e^2$, $e^4$ are omitted. Such a controller B′, with the proper reversing switch C′, cut-out switch D′, and its connections, is shown diagrammatically in Fig. 8. Fig. 9 shows a simple diagram of the connections of Fig. 8 in the series positions (position 1 to 7) of the controller, both pairs of motors being connected. Fig. 10 is a diagram similar to Fig. 9 but with motors 1 and 2 cut out. Fig. 11 is a somewhat similar diagram but shows the connections in the parallel positions (positions 8 to 12) of the controller and with the motors 3 and 4 disconnected. The electrical connections and effect of the cut-out switch shown in Figs. 8 to 11 are practically the same as that of the one shown in Figs. 1 to 7 save that no cross connections between the field windings are here opened. The type of cut-out switch is also different from that of the one shown in Figs. 1 to 7 inclusive, for instead of two switch blade sets independently movable, but one set of sector-shaped switch blades is used, each of these blades being arranged to be in contact with the proper contacts $J_1$ in all positions of the switch, to be in contact with the contacts $J_2$ and $J_3$ in the middle position of the switch (Fig. 9), and to be out of contact with the contacts $J_2$ and $J_3$ respectively in the two extreme positions of the switch (Figs. 10 to 11). The structure of this type of cut-out switch D′ is more fully shown in Figs. 12 and 13. Bolted or otherwise fastened to the back of the controller casing is a flanged U-shaped frame L of any suitable material and against the sides of said frame are fastened plates M and N of slate or other suitable insulating material. Through the plates M and N extends a shaft O, round from the plate N to its right hand end (Fig. 13) and square throughout the rest of its length. This shaft has suitable bearings O′ for rotation in the plates M and N. Firmly fastened to, but insulated from the shaft O are the sector-shaped blades $a$, $c$ and $d$, $a$ and $c$ being on opposite sides of plate M, and $d$ on the inner side of plate N. These blades are each adjustably clamped to the shaft by the split collar $c_1$, and tightening bolt $c_2$. Fastened to the plates M and N are the sets of contacts $J_1$, $J_2$, and $J_3$, each of these contacts being composed of two separate fingers fastened in a connection block P and so arranged that the sector-shaped switch blades when rotated slide between the two fingers of the contacts. As illustrated diagrammatically in Figs. 9 and 11, the blades are in contact with contact $J_1$ in all three positions of the cut-out switch and are out of contact with the contacts $J_2$ and $J_3$ respectively in the two extreme positions of the cut-out switch. The end of the shaft of the cut-out switch is made of the proper size and shape to fit the removable handle of the reversing switch and is intended to be operated thereby, so that the reversing switch is required to be in "off" position when the cut-out switch is operated.

Although I have described my invention in what I now believe to be the preferred form, it is obvious that many changes may be made in the particular construction of the various parts without departing from the broad spirit of the invention, and therefore I do not wish to be limited to the precise details shown and described.

What I claim as new and desire to secure by Letters Patent is:—

1. A motor controller controlling two pairs of motors, and a single cut-out switch whereby either pair of said motors may be cut out without changing the effect of the controller on the other pair.

2. A motor controller controlling a plurality of motors, and a unitary cut-out switch whereby any of said motors may be cut out without changing the controller action on the motors not cut out.

3. A motor controller, a plurality of sets of motors controlled thereby, and a single cut-out switch whereby any one of said sets of motors may be cut out without interfering with the effect of the controller upon any other set of motors.

4. A motor controller, two sets of motors controlled thereby, and a cut-out switch operable only in its entirety and by means of which either set of motors may be disconnected without affecting the controller action on the other set of motors.

5. A "series-parallel" motor controller, a plurality of pairs of motors controlled thereby, a reversing switch for said motors and a single cut-out switch whereby any pair of motors may be cut-out without affecting the series-parallel control of the remaining motors.

6. Two pairs of electric motors, a cut-out switch operable only in its entirety and by means of which either pair may be cut out, and a controller for all of said motors, so constructed and arranged that it has the same controlling action on either pair of motors whether the other pair is cut out or not.

7. A plurality of electric motors, a single cut-out switch whereby any of said motors may be disconnected, and a controller for the motors so connected and arranged that it has the same controlling action on any particular motor or motors whether the remaining motors are connected or disconnected.

8. A plurality of pairs of electric motors, a single cut-out switch by means of which either pair of motors may be disconnected, and a "series-parallel" controller for the motors having the same series-parallel control over any pair of motors whether any other pair is connected or disconnected.

9. Two sets of electric motors, a unitary cut-out switch which in one position cuts out one set of motors, in another position cuts out the other set of motors, and in a third position connects both sets of motors, and a controller for the motors so connected and arranged that it has the same action on either set of motors whether the other set of motors is connected or disconnected.

10. Two pairs of electric motors, a unitary cut-out switch having three positions, for disconnecting each pair of motors and for connecting both pairs respectively, and a "series-parallel" controller for the motors, so arranged that it has the same series-parallel control over either pair of motors whether the other pair is connected or disconnected.

11. Two sets of electric motors, a controller for connecting the different motors of each set either in series or in parallel relation, and a cut-out switch for connecting the two sets in parallel or cutting out either set of motors while still permitting the series-parallel control of the other set.

12. Two pairs of electric motors, a controller for connecting the two pairs of motors both in series and in parallel relation, and a cut-out switch for connecting the motors of each pair in parallel or cutting out one of each pair of motors while still permitting the series-parallel control of the remaining motors.

13. Two pairs of parallel connected electric motors, and a unitary cut-out switch which in one position cuts out one of each pair of motors, and in another position cuts out the other of each pair of motors.

14. Two normally parallel connected pairs of electric motors, and a unitary cut-out switch for cutting out either pair of motors.

15. Two pairs of electric motors, a cut-out switch, comprising a plurality of blades fixed on a rotatable shaft and so connected and arranged that in one position of the shaft and blades one pair of motors is cut out and in another position the other pair of motors is cut out, and a reversing switch for said motors.

16. Two pairs of electric motors, and a cut-out switch comprising a plurality of blades fixed on a rotatable shaft and so connected and arranged that in one position of the shaft and blades one pair of motors is cut out, in another position the other pair of motors is cut out and in a third position the two pairs of motors are connected in parallel.

17. Two pairs of series motors, a plurality of switch blades forming a cut-out switch and in different positions connecting the two pairs in parallel and cutting out one or the other pair, and a controller for connecting the two motors of each pair both in series and in parallel relation, and controlling each pair of motors independently of the position of the cut-out switch as regards the other pair of motors.

18. A plurality of motors, a controller therefor, a cut-out switch comprising a plurality of switch blades, each blade coacting with three contacts connections from the middle contact of each blade to the controller, and connections from the outside contacts of each blade to one of the motors.

19. A plurality of motors, a controller therefor, a cut-out switch comprising a plurality of switch blades mounted on a single shaft, a middle contact for each blade engaging therewith in all positions of the cut-out switch and connected to the controller, and an outer contact on each side of each middle contact, each of the outer contacts being arranged to be out of engagement with its coacting blade in one position of the cut-out switch and being connected to one of the motors.

20. A series-parallel controller, a plurality of motors controlled thereby and a cut-out switch movable only in its entirety and arranged to cut out any of the motors, while still permitting the controller to have the same effect on the other motors as when no motors had been cut out.

21. A plurality of electric motors, a cut-out switch for cutting out some of the motors, and a controller so constructed and arranged that it makes the same connections for any motor or motors for all positions of the controller in the same manner, regardless of whether the other motor or motors are connected or cut out.

22. A plurality of electric motors, a cut-out switch in different positions connecting all of said motors and cutting out various ones, and a "series-parallel" controller arranged to make the same connections, independently of the position of the cut-out switch.

23. A plurality of normally parallel-connected sets of electric motors, a cut-out switch at which the current for the different sets divides, said cut-out switch being arranged to cut out any set of the motors, and a controlling switch for varying the voltage impressed on the different motors.

24. A main controlling drum and coöperating contact fingers, a plurality of sets of motors controlled thereby, and a cut-out switch whereby any set of said motors may be cut out without rendering any of said contact fingers inactive.

25. A main controlling drum and coöperating contact fingers, a plurality of motors controlled thereby, and a cut-out switch whereby certain of said motors may be cut out without changing the electrical action of said drum and fingers on the motor or motors not cut out.

26. In combination, a plurality of sets of motors, a controlling switch for connecting the motors comprising each set in various relations while the relation between the sets of motors remains unchanged, and a cut-out switch for connecting the different sets in parallel or for cutting out any set.

27. In combination, a plurality of sets of motors, a main controlling switch for connecting said sets in various relations, and a cut-out switch arranged to connect the motors forming each set in parallel or to cut out one motor of each set.

28. In combination, a main controlling switch, a plurality of sets of motors controlled thereby, a cut-out switch, leads from the cut-out switch to the main controlling switch, leads from the cut-out switch to the motors, said cut-out switch normally connecting each of the former leads to two of said latter leads and arranged to disconnect certain of said latter leads.

29. In combination, a main controlling switch, a plurality of sets of motors controlled thereby, a cut-out switch, leads from the cut-out switch to the main controlling switch, leads from the cut-out switch to the motors, said cut-out switch normally connecting each of said former leads to two of said latter leads which lead to different motors and arranged to disconnect each of said former leads from either of the leads to which it is normally connected.

30. In a controller, a controlling drum, a reversing switch, a notch plate for the reversing switch, an arm pivoted eccentrically of the controlling drum and biased toward engagement with the notch plate to lock the reversing switch, and means on the controlling drum for forcing the arm away from the notch plate.

31. In a controller, a controlling drum, a reversing switch, notch plates for said drum and switch, an arm pivoted eccentrically of the controlling drum and biased toward the notch plate for the reversing switch, thereby locking said switch, and means on the notch plate of the controlling drum for forcing the arm away from the reversing switch notch plate in a predetermined position of the drum.

32. In a controller, a controlling drum, a reversing switch, a notch plate for the reversing switch, a two armed lever pivoted eccentrically of the controlling drum, one arm of said lever being spring pressed towards the notch plate and when engaging the same locking the reversing switch, and means on the controlling drum for engaging the other arm of said lever and unlocking the reversing switch in a predetermined position of the controller.

33. In a controller, a controlling drum, a reversing switch, a notch plate for the reversing switch, a star wheel for the controlling drum, a bell crank lever, one end of which is spring pressed toward the notch plate to lock the reversing switch, and a lug on the star-wheel arranged to engage the other arm of said bell crank lever in a predetermined position of the drum and force the first mentioned arm out of engagement with the notch plate.

34. In a controller, a controlling drum, a star-wheel therefor, a reversing switch, a notch plate therefor, arm pivoted eccentrically of the controlling drum and biased toward engagement with said notch plate to lock said reversing switch, a projection from said arm, and a lug on said star-wheel arranged to engage said projection and unlock said reversing switch when the controlling drum is in "off" position.

35. In a controller, a controlling drum, a star-wheel therefor, a reversing switch, a notch plate therefor, an arm pivoted eccentrically of the controlling drum and spring-pressed toward engagement with said notch plate to lock said reversing switch, and having a projection extending over the star wheel, and a lug on said star-wheel arranged to engage said projection and release the reversing switch in a predetermined position of the controlling drum.

36. In a controller, a controlling drum, a star-wheel therefor, a reversing switch, a notch plate therefor, an arm pivoted eccentrically of said drum and biased toward engagement with said notch plate, a projection from said arm extending over the star-wheel, and a lug on the upper side of said star wheel arranged to engage said projection when the drum is in "off" position and thereby force said arm away from said notch plate to release the reversing switch, said lug and projection not being in engagement when the drum is not in "off" position, thus allowing the arm to engage the notch plate to lock the reversing switch.

37. A motor controller controlling two pairs of motors, a single cut-out switch whereby either pair of said motors may be cut out without changing the effect of the controller on the other pair, and a separate reversing switch for said motors.

38. A motor controller controlling a plurality of motors, a unitary cut-out switch whereby any of said motors may be cut out without changing the controller action on the motors not cut out, and an independently operable reversing switch for said motors.

39. In combination, a rotatable drum and coöperating contact fingers, a plurality of sets of motors controlled thereby, and a single cut-out switch whereby any one of said sets of motors may be cut out without interfering with the effect of the controller upon any other set of motors.

40. In combination, a rotatable drum and coöperating contact fingers, two sets of motors controlled thereby, and a cut-out switch operable only in its entirety and by means of which either set of motors may be disconnected without affecting the controller action on the other set of motors.

41. Two pairs of electric motors, a cut-out switch operable only in its entirety and by means of which either pair may be cut out, a reversing switch for said motors, and a controller for all of said motors, said controller being so constructed and arranged that it has the same controller action on either pair of motors whether the other pair is cut out or not.

42. A plurality of electric motors, a single cut-out switch whereby any of said motors may be disconnected, and a single drum controller for the motors so connected and arranged that it has the same controlling action on any particular motor or motors whether the remaining motors are connected or disconnected.

43. A plurality of pairs of electric motors, means for reversing said motors, a single cut-out switch by means of which either pair of motors may be disconnected, and a series-parallel controller for the motors having the same series-parallel control over any pair of motors whether any other pair is connected or disconnected.

44. Two sets of electric motors, a controller for connecting the different motors of each set either in series or parallel relation, a reversing switch, and a cut-out switch for connecting the two sets in parallel or cutting out either set of motors while still permitting the series parallel control of the other set.

45. Two pairs of electric motors, a single drum controller for connecting the two pairs of motors both in series and parallel relation, and a cut-out switch for connecting the motors of each pair in parallel or cutting out one of each pair of motors while still permitting the series-parallel control of the remaining motors.

46. A plurality of electric motors, a cut-out switch for cutting out some of the motors, and a single drum controller so constructed and arranged that it makes the same connections for any motor or motors for all positions of the controller in the same manner, regardless of whether the other motor or motors are connected or cut out.

In testimony whereof I affix my signature, in the presence of two witnesses.

EMMETT W. STULL.

Witnesses:
GEO. B. SCHLEY,
FRED J. KINSEY.